UNITED STATES PATENT OFFICE.

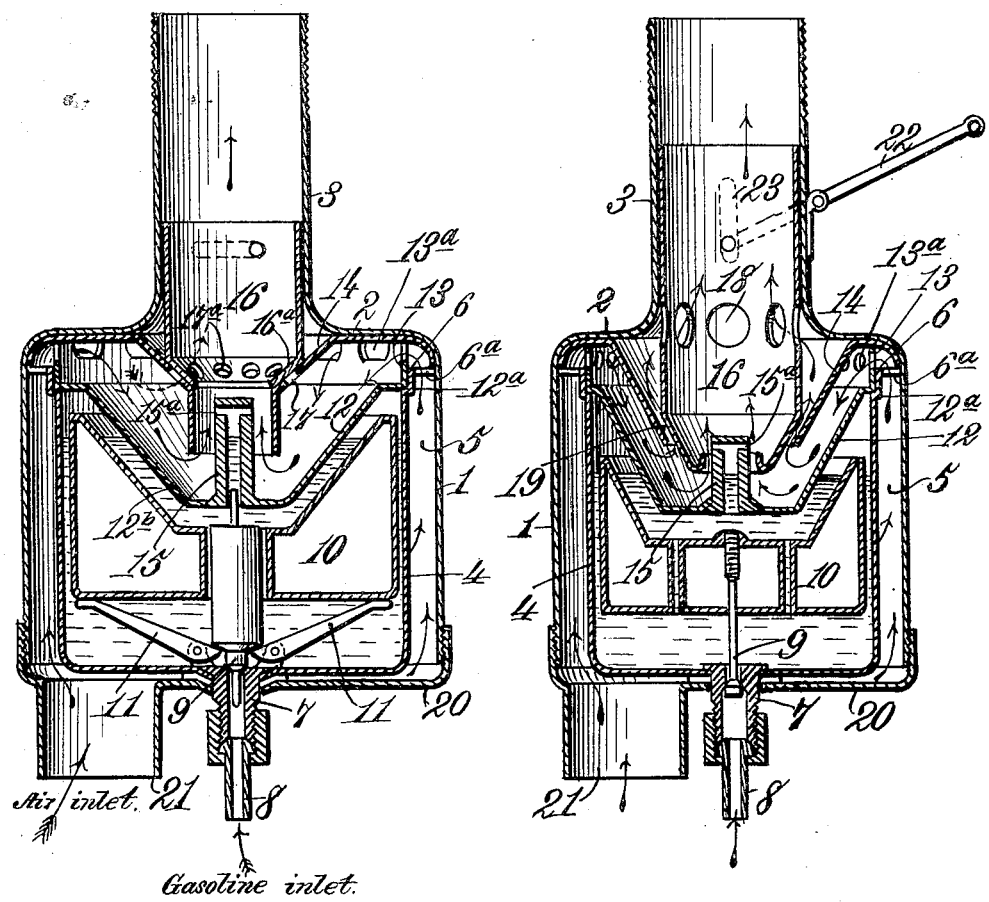

JULIUS WM. WALTERS, OF GLENS FALLS, NEW YORK.

CARBURETER.

976,322.   Specification of Letters Patent.   Patented Nov. 22, 1910.

Application filed November 21, 1905. Serial No. 288,401.

*To all whom it may concern:*

Be it known that I, JULIUS WM. WALTERS, a citizen of the United States, residing at Glens Falls, in the county of Warren and State of New York, have invented new and useful Improvements in Carbureters, of which the following is a specification.

My invention relates to improvements in carbureters, and has for its object to provide an efficient, constant-level, liquid-hydrocarbon carbureter of economical construction; one having a general design common to or characteristic of the several component parts or elements; and one in which the float-cup or chamber is surrounded by an air passage, whereby the vaporizable quality of the liquid hydrocarbon therein may be enhanced by heated air passing through such passage to the ejector or mixing chamber.

Having these objects in view, my invention resides in a liquid-hydrocarbon carbureter having the features hereinafter set forth and illustrated.

That which I regard as new will be set forth in the clauses of claim appended to the description.

In the accompanying drawings illustrating, as the statute requires, that which I regard as the best known embodiment of my invention,—Figure 1, is a central vertical section, and Fig. 2, is a similar view of a slightly different form of carbureter.

In said drawing, the reference numeral 1 designates a shell or casing to the general design of which the other sectional component parts of the carbureter conform; and which, together with such other sectional component parts is of spun or pressed material, preferably sheet or tubular metal. The body of said shell constitutes an inverted cup and in the illustrated example of my invention (but to which said invention is not restricted) is cylindrical. It is constructed with a shoulder 2 to coöperate with a confining element (as will be described) to hold the several parts arranged within the cup in operative position. Above the shoulder the shell or casing is formed with a tubular neck 3, provided with means, such as screw-threads, by which it may be coupled to the motor connections.

Within the shell or casing 1 is disposed a float chamber 4, cup-shaped, and, as stated, conforming to the shape of the shell or casing, but of lesser diametrical proportion, to provide within the shell or casing and about the bottom and wall of the float chamber, an air passage, channel or space 5, to the end that the air, which it is designed shall be warmed or heated, as may be required (coming from any suitable source of heat) shall come into intimate contact with and surround or envelop the bottom wall and top of the float chamber or cup, and the heat thereof conducted or transmitted to the liquid-hydrocarbon within the same, enhancing the volatile or vaporizable quality thereof. By this arrangement the heavier hydrocarbons, which heretofore have been used with difficulty and indifferent success, are rendered more easily vaporizable. The float cup is centered within the shell or casing by means of a lateral flange 6 which fits against the casing as shown, and which is provided with perforations or air passages $6^a$ leading from the channel, passage or space 5, to the ejector. To the bottom of the float-cup is connected a nozzle 7, which projects through the cover or cap 20 and is fashioned, as by screw-threads, for connection with a source of hydrocarbon liquid supply 8. Within the float-cup is arranged a float 10, which maintains a constant level of hydrocarbon liquid in the cup by its influence on the valve 9 exerted, as shown in Fig. 1, through the medium of valve-opening arms 11, or as shown in Fig. 2, directly, the valve being connected to the float.

The numeral 12 designates a hollow frusto-conical float-cup cover supported upon an annular seat $12^a$, of the float-cup, and having an upwardly extending peripheral ring 13 provided with air passages $13^a$, leading to the ejector and completing the air conduit from the space 5. The ring 13 extends nearly to the shoulder 2 of the shell or casing, leaving a space for the reception of a deflector 14, which is held in place by said ring when the parts are assembled as hereinafter described. The cover is dished as shown at $12^b$, and supports, centrally, the ejector 15 of any suitable type having fluid exit openings $15^a$.

The air deflector 14 is provided with an annular rim which fits against the shell or casing and is disposed between the shoulder of said shell and cover-ring 13, and is constructed with an annular, frusto-conical deflector wing extending over the cover 12 to deflect the air against the cover, which air imparts heat to the contents of the float-cup and discharges immediately about the ejector.

It will be observed upon consideration of the foregoing description and the drawings that the air (the course of which is indicated by the arrows) effectively envelops the float-cup and its contents in passing to the ejector. The air being in a heated condition, coming from any suitable, convenient source of heat, heats the hydrocarbon liquid and increases its capacity of vaporization. The parts thus described conform to a general design, as shown here being cylindrical, and are of proper proportions with relation to each other to perform their several functions, whereby they may, severally, in proper order and in the coöperative inter-relation described be quickly assembled and nested within the shell or casing and held in such relation by a confining cap 20 having detachable (for example a screw thread) connection with the shell or casing. This cap 20 when screwed on forces the deflector 14 against the shoulder 2 of the shell or casing, and the ring 13 of the float-cap cover against the deflector, and the float-cup against its cover as shown, and maintains that relation.

21 designates a heated air inlet through the cap 20 leading in the air from any suitable source of heat and discharging it into the float-cup enveloping air-passage for the purpose set forth.

Movably supported within the neck 3 of the shell or casing is a regulator 16 adapted to coöperate with the deflector 14 to control or regulate the action of the carbureter.

In Fig. 1, the regulator is a rotatable one having a coned lower end 16a, conforming to and adapted to fit against the cone-wing of the deflector. The deflector wing and the regulator are provided with registering air passages 17, 17a, which may be more or less opened or closed by rotation of the regulator as will be obvious. In Fig. 2, the regulator is coned at its lower end to fit snugly against the coned deflector wing when adjusted for that purpose to close the passage of air at that point, and is provided with openings 18 to coöperate with the wall of neck 3. This regulator is fitted in the neck to be reciprocated vertically to and from the coned deflector wing to open or close the air-way 19 and to more or less open or close the openings 18. The openings 18 are so arranged for coöperation with the wall of the neck 3 that they may be drawn into the neck and closed to cut off passage of air therethrough, or more or less opened to increase or decrease the air current therethrough. The regulator is connected to any suitable type of shifter shown in Fig. 2, as a lever 22 pivoted to the neck 3, one end of which works through an elongated opening 23 in the neck and connected to the regulator.

In addition to the advantages already described, the construction of the several parts (except the injector, valve, coupling and regulator shifter) according to a general design, enables me to construct the carbureter of spun or pressed inexpensive material, as sheet or tubular metal, doing away with the more expensive methods of manufacture involving the casting and machining of such parts heretofore known, and I also obtain a more accurate construction in its parts and as a whole apparatus.

In practice the several parts of the carbureter may be assembled for operation and operated, as follows: The regulator is inserted into the neck of the shell or casing and the shifting lever is connected therewith. The float is then disposed in the float-cup and the valve is associated therewith. The float-cup cover and the deflector are then applied, and the assembled parts introduced within the shell or casing; and finally the confining cap 20 is attached to hold the parts in position. The carbureter is then connected to the motor or other apparatus to be operated and to a source of hydrocarbon supply.

In use the air coming from any suitable source of heat, passes through the cap and surrounds or envelops the exterior surface and cover the float-cup on its way to the ejector, heating and increasing the capacity of vaporization of the liquid-hydrocarbon therein, to a suitable degree, as may be desired by operator.

Having described my invention what I claim is:

1. A constant level carbureter comprising a shell or casing, a float cup arranged therein and provided with a centrally depressed cover, said float cup being spaced apart at its sides, bottom and top from said casing to form an air passage entirely around said cup, an ejector in said depression opening into said cup for the escape of hydrocarbon, an air inlet at the bottom of the casing, and means at the top of said casing for deflecting air into the said depression.

2. A constant level carbureter comprising a shell or casing, a float cup within said casing and provided with a centrally depressed cover, said float cup being spaced apart at its sides, bottom and top from said casing to form an air passage entirely around said cup, a float within said float cup having its top shaped to conform with the float cup cover, an ejector in said depression opening into said float cup for the escape of hydrocarbon, an air inlet at the bottom of said casing, and means pendent from the top of the casing having its sides shaped to conform with said depression for deflecting air into the depression and toward the ejector.

3. A constant level carbureter comprising a shell or casing and arranged therein a float cup spaced from said casing, a float within said cup, suitable means for maintaining a constant fluid level by means of said float, a cover for said cup of frusto-conical shape and provided with an ejector, a similarly shaped air deflector pendent from the casing above the frusto-conical cover and provided with by-pass perforations higher than the outlet opening of said deflector, a regulator fitted to said deflector and provided with openings adapted to coöperate with said by-pass openings, and an air inlet at the bottom of the casing.

4. A constant level carbureter comprising a shell or casing, and arranged therein a float cup provided with a valved hydrocarbon inlet and with a frusto-conical cover, said float cup spaced apart on all sides of said casing to form an air passage by which it is complete enveloped, a float in said cup having a depressed upper surface, suitable means for maintaining a constant level by means of said float, an ejector supported by said float cup cover at its lowest part, an air deflector above the cover conforming to the shape thereof and provided with a plurality of openings therein, and a regulator also provided with openings, operatively associated with said ejector and deflector.

5. A constant level carbureter, the sectional parts of which conform to a general frusto-conical design, said parts comprising a shell or casing having an air inlet in its lower end, a float cup arranged in said shell and spaced apart therefrom to form an air passage by which it is enveloped or surrounded, a float within said cup, suitable means for maintaining a constant fluid level by means of said float, a cover for said cup supporting an ejector, an air deflector above the cover provided with outlet openings, and a regulator operatively associated with said ejector and deflector also provided with openings.

6. A constant level carbureter comprising a casing, a float cup therein, and spaced apart therefrom whereby an air passage is formed around said cup, a cover for said cup of inverted-conical shape to increase its superficial area, and an air deflector of similar shape nesting therein but slightly spaced therefrom whereby heated air after traversing said passage is caused to impinge against said cover and heat the same.

7. In a constant level carbureter, a casing, a float cup contained within said casing and surrounded on its sides, bottom and top by an air passage, a float in said cup, a centrally disposed cover closing the top of said float cup and projecting downwardly into the same, a hydrocarbon ejector in said depression, and means through which air is introduced into said casing, and caused to circulate below the bottom and around the sides of the float cup, and to impinge against the upper side of said centrally disposed cover.

In testimony whereof I have hereunto set my hand in presence of two subscribing witnesses.

JULIUS WM. WALTERS.

Witnesses:
A. P. W. KINNAN,
THOMAS A. BOLIN.